Figure 1:
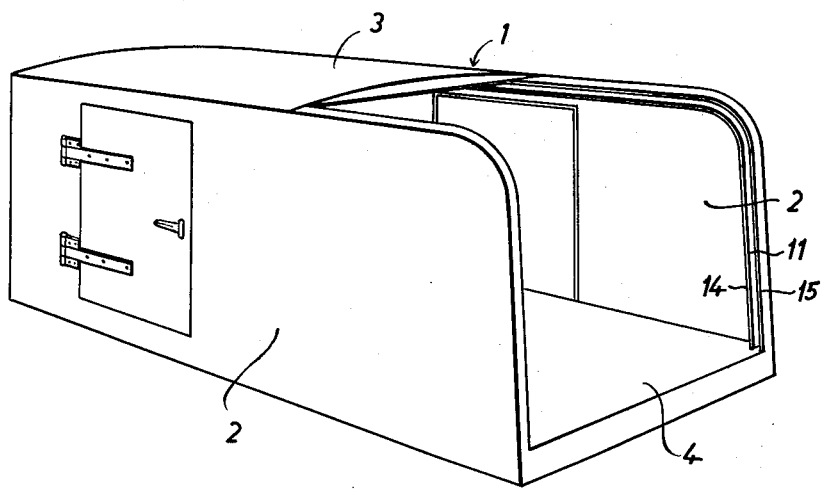

July 11, 1961  O. I. GROTH ET AL  2,992,040
COVERING STRUCTURE FOR WAGONS, TRUCKS AND THE LIKE
Filed June 30, 1958  3 Sheets-Sheet 1

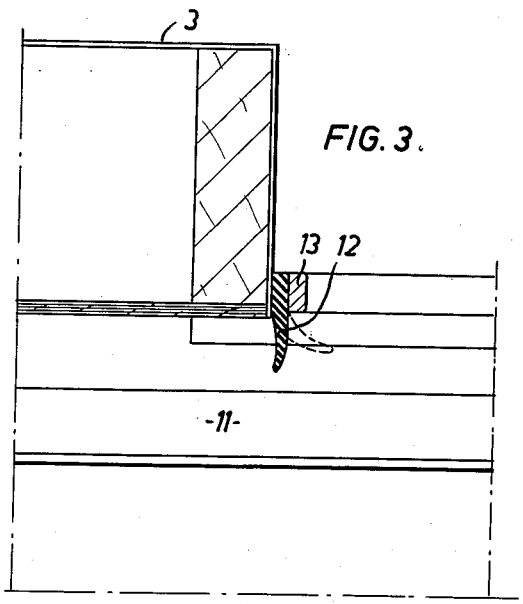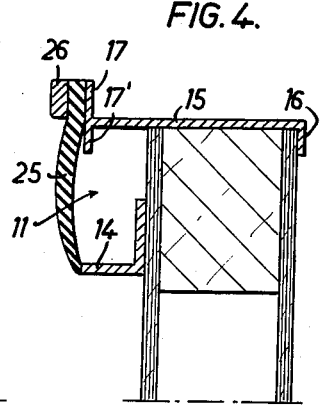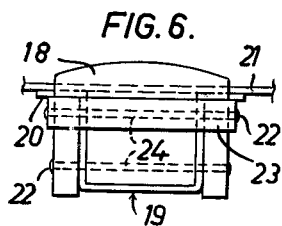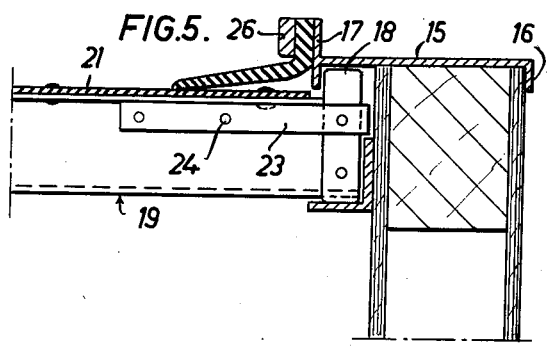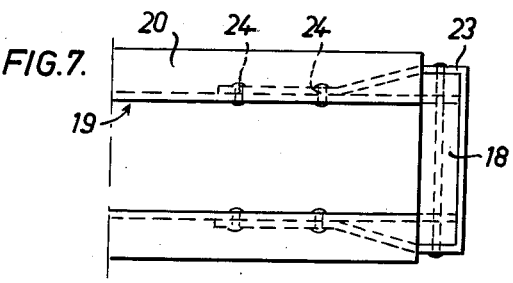

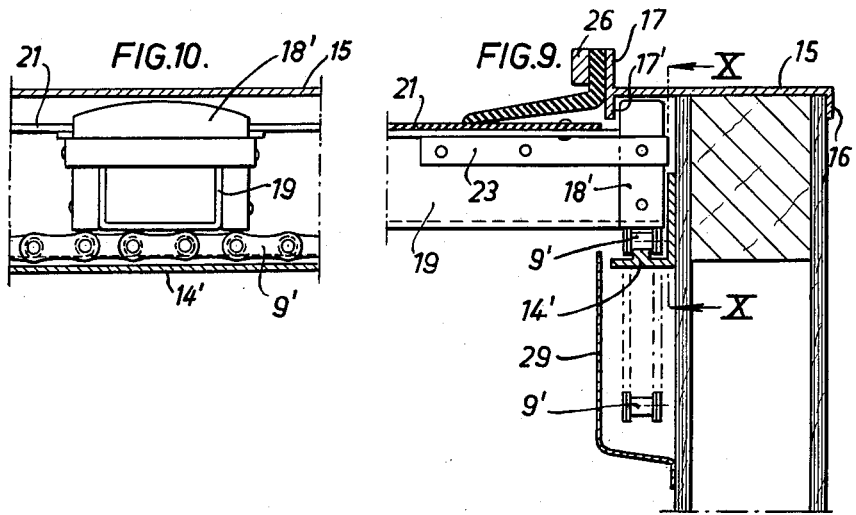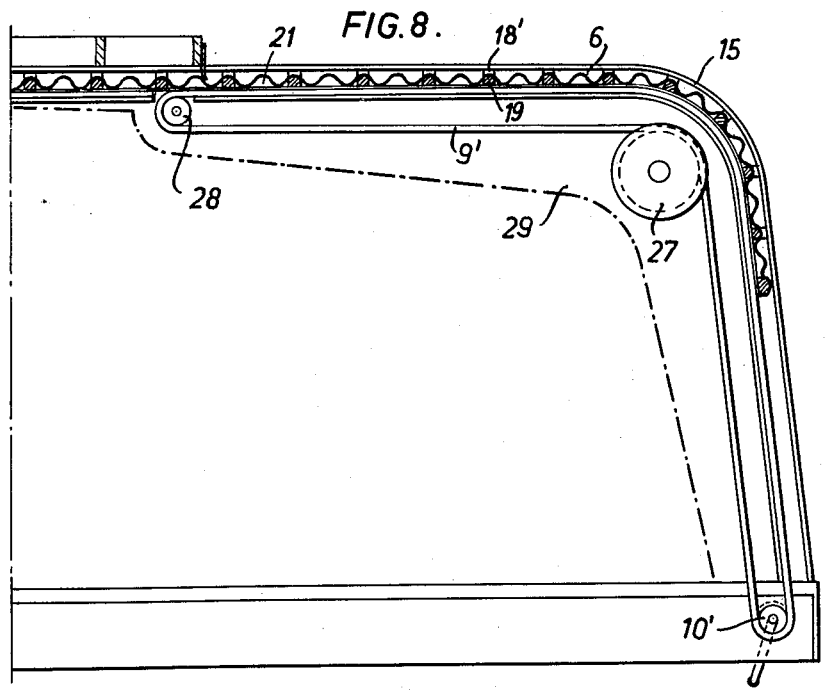

United States Patent Office 2,992,040
Patented July 11, 1961

2,992,040
COVERING STRUCTURE FOR WAGONS, TRUCKS AND THE LIKE
Otto Ivar Groth, Sture H. Carlson, and Karl A. I. Carlsson, Oskarshamn, Sweden, assignors of one-half to Erik Svensson, Lillsjodal, Sweden
Filed June 30, 1958, Ser. No. 745,689
3 Claims. (Cl. 296—100)

The present invention relates to covering structures for wagons, trucks or freight cars, railway carriages or carriages in general of the covered type.

Reference is had to our co-pending application, Serial No. 846,693, filed October 15, 1959.

Covering structures for small as well as for large trucks are known, such as delivery vans and pantechnicon vans. These carriages are usually provided with doors at their back. However, said carriages have several drawbacks. Thus on one hand it is difficult to make full use of the available space because of its tunnel-like shape, and on the other hand an economical loading with common loading means, such as cranes, is rendered impossible due to the fact that the goods can only be brought near or only with a small portion in over the truck platform. As a result one has generally to move the pieces of goods by hand in over the platform and the handling of a heavy piece of goods requires many hands. Moreover long wares having a length exceeding that of the truck platform can not be transported as in this case at least one half of the door must be open. Wares having a greater height than the roof of the covering structure can not be transported by such vans either.

It is known to replace said doors by a flexible cover adapted to be drawn over the opening but this opening has been restricted to correspond to that closed by the doors. Therefore, said drawbacks are not removed by this changed construction.

The main object of the invention is to avoid said drawbacks by providing an opening adapted to be closed by a sliding flexible cover or the like so that it extends freely over vertical as well as horizontal portions of the covering structure.

By this arrangement of the opening it is possible by means of a crane to place the wares directly onto the truck platform or unload the wares directly from said platform without using any assisting means, such as loading platforms, trestles or the like.

Further the arrangement according to the invention may advantageously be used for ventilation and passing through carriages coupled together said carriages being of other type than load-carriages.

However, as the said opening extends over the whole vertical end portion of the covering structure from one side wall to the other and as the opening simultaneously takes up a large portion of the roof or the whole roof, said side walls will be unbraced. To make said side-walls rigid by means of a self supporting construction would lead to an excessively heavy and bulky structure.

It is another object of the invention to avoid such a bulky self-supporting wall construction by constructing the sliding flexible cover closing said opening so as to take up tensile forces between the side walls defining said opening.

To this end grooves in the sidewalls for guiding the flexible cover are provided at least at their one longitudinal edge with a flange adapted to take up forces from heads secured to transverse rigid bars or the like of the flexible cover. Preferably the said flange is provided at the upper edge of the groove.

Still another object of the invention is to protect the grooves from moisture when the opening is uncovered and avoid damages at loading by providing a strip of flexible material temporarily covering said grooves when the cover is drawn aside.

In the folowing some preferred embodiments of the invention are described with reference to the accompanying drawings. These embodiments are for the sake of simplicity shown applied to trucks, but it is to be noted that they are given as examples only and do not restrict the scope of the invention to this special purpose or to the detail construction shown.

Figure 2:
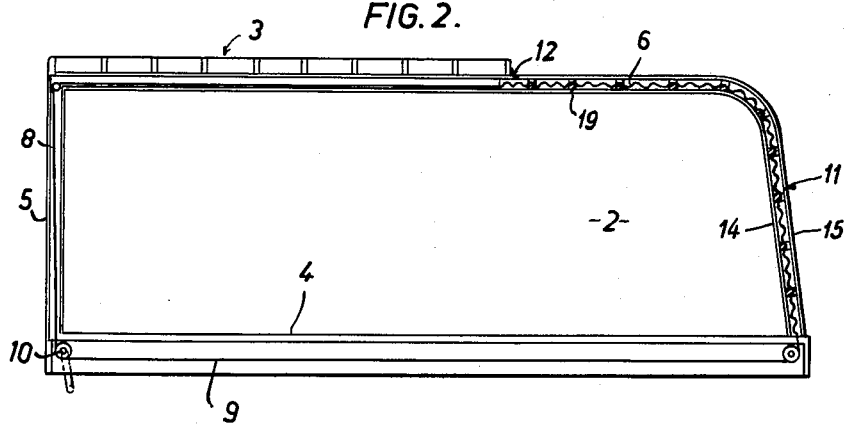

In the drawings: FIGURE 1 is a perspective view of a covering structure according to the invention; FIGURE 2 is a schematic longitudinal sectional view of the same structure; FIGURE 3 is a large scale fragmentary detail sectional view of the upper part of the opening of said structure; FIGURE 4 is a fragmentary sectional view of a guiding groove for the flexible cover; FIGURE 5 is a fragmentary sectional view similar to that in FIG. 4 and showing the flexible cover engaging therein; FIGURE 6 is an end view of a transverse rigid member included in the flexible cover; FIGURE 7 is an end view of said transverse member; FIGURE 8 is a fragmentary longitudinal sectional view of another embodiment of the covering structure according to the invention; FIGURE 9 is a large scale fragmentary sectional view of a guiding groove for a cover having a rigid transverse member engaging therein; and FIGURE 10 is an end view, partly in section, of said transverse member.

Referring now to FIGS. 1–7, a covering structure generally designated with 1 is adapted to be placed on a base frame of a truck and comprises two side walls 2, a roof 3, a floor 4 and a forward endwall 5.

The end of the covering structure opposite to the end wall 5 is completely open and said opening extends unobstructed over a part of the roof of the structure.

A flexible cover 6 of suitable form is adapted to be drawn over said angular opening by means of wires 8, 9 and a wire drum 10 driven by hand or by motor. Said flexible cover 6 can be entirely displaced under the roof portion 3 which has a length corresponding to that of said flexible cover 6. It is to be noted that the roof portion 3 may be lengthened forwards (to the left in FIG. 2) so that it extends over the driver's cabin and thereby a greater portion of the roof may be uncovered.

The side portions of the flexible cover 6 are guided in grooves 11 (FIGS. 3–5) and a rubber strip 12 is attached to the end margin of the roof portion 3 to prevent water or impurities to enter into the space between the flexible cover and the roof. A metal strip 13 is attached outside the rubber strip 12 to protect the latter and the edge of the roof portion from damages of the hoisting wire or the goods.

The guiding grooves 11 for the flexible cover 6 are generally U-shaped and may be built up by an angle-bar 14 secured to the inside of the side wall 2 and an opposite bar 15 having at its one longitudinal edge a flange 16 engaging the outer margin of the side wall 2. At its opposite longitudinal edge the bar 15 has a flange 17 extending substantially perpendicularly to the both sides thereof.

Sliding blocks 18 of "Bakelite" or the like are guided in the groove thus formed by the bars 14 and 15. The inwardly or downwardly directed portion 17' of said flange 17 hooks over the block 18 and prevents the latter to move transversely out of the groove 11. Owing to the fact that the flange 17 is provided only at the upper side of the groove 11 and not at the lower side thereof, particles that may enter into the groove will easily be removed and do not accumulate therein.

The sliding blocks 18, 18' are fastened to one end of rigid transverse members, such as bars 19 which are rigid or resistant to pulling forces. Said bars 19 form the supporting structure of the flexible cover 6 and extend transversely over said opening of the covering structure. The opposite ends of the bars 19 are provided with the corresponding sliding blocks 18 engaging the guiding grooves 11 in the opposite side walls 2.

The rigid bar 19 is generally U-shaped with outwardly bent edge portions 20, to which a covering sheet material 21 of rubberized fabric or the like is fastened. The edge portions 20 are cut away at the ends of the bar 19 and the remaining U-shaped end portion of the bar 19 extends into a corresponding recess in the sliding block 18 and is riveted to the latter by means of through rivets 22. A reinforcing strip 23 in the shape of a yoke is secured to the sliding block 18 and the shanks of said reinforcing strip 23 are by means of rivets 24 attached to the side flanges of the U-shaped bar 19.

The upper side of the sliding block 18 is curved and at the under side said block has end portions projecting downwardly beyond the under side of the web of said U-shaped bar 19 to permit the sliding blocks 18 to move the arcuate portion of the guiding groove 11 without being jammed therein.

In FIGURES 4 and 5 a protecting strip 25 of flexible material, such as rubber is shown secured to the flange 17. Outside said rubber strip 25 a metal strip 26 is attached for the same purpose mentioned in connection with the above described strips 12, 13. The rubber strip 25 is broad enough to cover the groove 11 when said flexible cover 6 is drawn aside.

FIGURES 8-10 show a modified embodiment of the covering structure according to the invention. In these figures the same numbers are used for the designation of details corresponding to those in FIGURES 1-7.

As is obvious from FIGURE 8 the means for drawing the flexible cover in over the opening comprises an endless roller chain 9' led over wheels 10', 27 and 28 and engaging the lower flange 14' of the angle-bar forming one side of said guiding groove 11. The chain 9' may be driven by hand or by motor.

Said flange 14' has a ridge projecting into the groove 11 and on which the rollers of said chain 9' run. The sliding blocks 18' rest against the upper side of said chain 9' and the latter is secured to the front end of said flexible cover 6 only.

The chain 9' is suitably enclosed by a shield 29 of sheet material forming a flute as is best shown in FIGURE 9 for draining water that possibly may enter between the flexible cover 6 and the side walls 2.

It is to be noted that the flexible cover 6 is for the sake of simplicity in FIGURES 2 and 8 shown as a wave line. However, as schematically shown in FIG. 2, the flexible cover 6 comprises a series of the U-shaped transverse bars 19, which are connected together by the covering sheet material 21.

We claim:

1. A covering structure, for use in connection with a freight carrying vehicle having a platform, comprising in combination opposite unbraced plane side walls supported by said platform, a roof extending from about midway to the front of said side walls defining therewith an opening extending continuously along interconnected upper and rear edge portions at the rear part of said side walls, said side walls including throughout their edges tracks extending beneath said roof, a sliding flexible cover comprising transverse rigid members spaced apart from each other and a covering sheet connected to said members, each member including a terminal head one at each end in sliding engagement in a track, each track having flange means anchoring said heads against movement at right angle to the plane of the corresponding side wall, and means operable for moving said flexible cover to close and respectively to open said opening.

2. A covering structure, as claimed in claim 1, each track comprising a U-shaped member defining a channel along the inside of said side walls and operable to anchor the heads of the transverse rigid members against movement at right angle to the side walls, thereby supporting said side walls against lateral tilting movement.

3. A covering structure, as claimed in claim 1, said means for moving the flexible covering comprising an endless roller chain in each of said tracks, each track comprising a ridge forming a rail for the rollers of said chains, said heads resting against the upper side of said chains, the heads at the end of said flexxible cover being connected to said chain.

References Cited in the file of this patent

UNITED STATES PATENTS

| 1,718,183 | Smith | June 18, 1929 |
| 1,893,351 | Austin | Jan. 3, 1933 |
| 2,086,091 | Payette | July 6, 1937 |

FOREIGN PATENTS

| 585,481 | Germany | Oct. 4, 1933 |
| 420,573 | Great Britain | Dec. 4, 1934 |
| 491,198 | Great Britain | Aug. 29, 1938 |